United States Patent [19]

Smrekar et al.

[11] 3,775,811
[45] Dec. 4, 1973

[54] APPLIANCE FOR LINEAR BODIES
[75] Inventors: Clarence E. Smrekar, Cleveland; Erwin H. Goetter, Willoughby Hills, both of Ohio
[73] Assignee: Preformed Line Products Co., Cleveland, Ohio
[22] Filed: July 26, 1972
[21] Appl. No.: 275,227

[52] U.S. Cl............. 24/122.6, 24/123 A, 24/126 L, 24/131 C
[51] Int. Cl............................................. F16g 11/04
[58] Field of Search ...................... 24/123 R, 123 E, 24/126 L, 126 R, 131 C, 123 C, 123 F, 123 A, 136 L, 122.6

[56] References Cited
UNITED STATES PATENTS
| | | | |
|---|---|---|---|
| 1,746,759 | 2/1930 | Baker................................ | 24/123 A |
| 1,857,436 | 5/1932 | Cole................................. | 24/122.6 |
| 1,994,674 | 3/1935 | Van Inwagen, Jr. ............... | 24/123 F |
| 2,341,922 | 2/1944 | King et al. .......................... | 24/122.6 |
| 3,544,142 | 12/1970 | Moss, Jr............................. | 24/123 A |
| 3,561,071 | 2/1971 | Schlein.............................. | 24/131 C |

Primary Examiner—Francis K. Zugel
Assistant Examiner—Kenneth J. Dorner
Attorney—Jerry D. Hosier

[57] ABSTRACT

The disclosed termination appliance for a load bearing cable or the like comprises a frusto-conical member having a central bore for passing the cable and a peripheral flange at its enlarged end. Helical rods captivated by the flange extend along the beyond the conical member for gripping the cable. The described subassembly is disposed in a housing having a central passage of a contour complementary to that of the frusto-conical member for receiving said member with the helical elements wedged between the member and the internal housing walls. Other features are disclosed.

12 Claims, 5 Drawing Figures

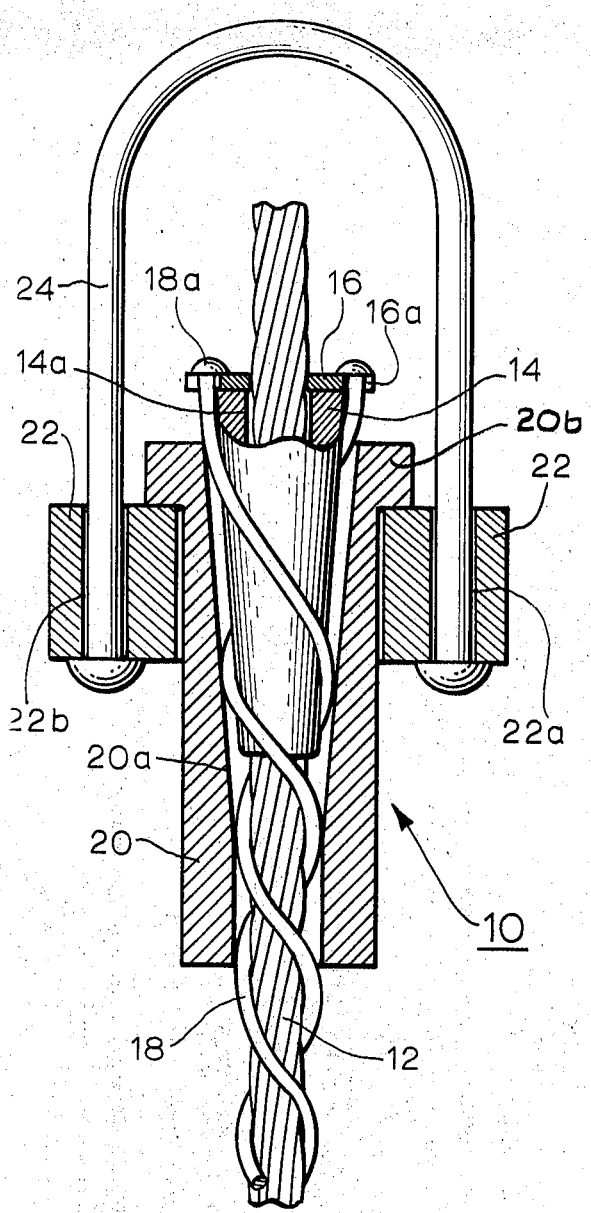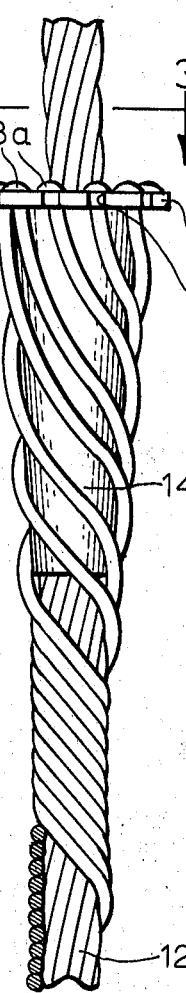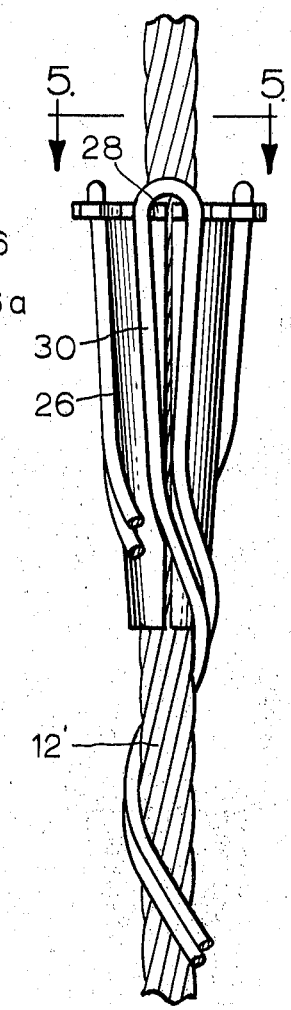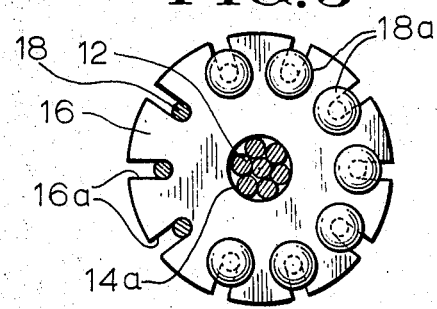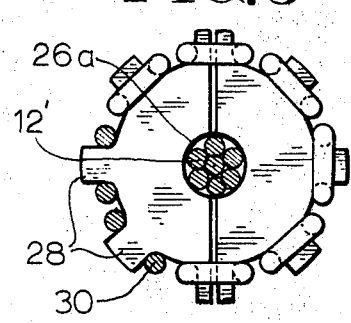

APPLIANCE FOR LINEAR BODIES

FIELD OF THE INVENTION

The present invention relates generally to appliances for linear bodies and, more particularly, is directed to a termination or dead-end type appliance for a load bearing cable or the like. The field of the invention may further be refined to termination appliances of a type employing helically preformed rods.

SUMMARY OF THE INVENTION

The appliance of the invention is simply and easily applied to a cable and also may easily be disassembled without damage to the device. The appliance is also compatible with many different types of attachment devices and anchoring structures.

In accordance with the present invention, a termination appliance for a cable or the like comprises cable receiving means including an elongated member of a generally frustro-conical contour having a central bore for passing the cable and having a peripheral flange structure. There are also provided helically preformed rod means comprising a plurality of helical elements each preformed to a predetermined pitch length and a nominal internal diameter less than that of the cable. Each of the helical elements is captivated by the flange structure and extends from the flange along and beyond the frustro-conical member for gripping the cable. There is further provided housing means having a central passageway of a contour complementary to that of the frustro-conical member for receiving the subassembly of the cable receiving means and the helically preformed rod means.

BRIEF DESCRIPTION OF THE DRAWINGS

The novel features of the present invention are set forth with particularity in the appended claims. The invention together with further objects and advantages thereof may best be understood, however, by reference to the following description taken in conjunction with the accompanying drawings in the several figures of which like reference numerals identify like elements and in which:

FIG. 1 is a side elevational view, partly in section, of one preferred embodiment of the present invention;

FIG. 2 is a side view of a subassembly of the appliance of FIG. 1;

FIG. 3 is a plan view taken along lines 3—3 of FIG. 2;

FIG. 4 is a side elevational view depicting an alternative form of the subassembly of FIG. 2; and FIG. 5 is a top plan view taken along lines 5—5 of FIG. 4.

DESCRIPTION OF THE PREFERRED EMBODIMENT

Referrin now to the drawings and specifically to FIGS. 1–3, the termination appliance 10 there illustrated is adapted to receive and retain one end of a load bearing cable 12. The appliance 10 comprises a cable receiving means 14 in the form of an elongated member of a generally frustro-conical contour. The member 14 includes a central bore 14a for passing the cable 12 and a peripheral flange structure 16 that preferably is disposed at the enlarged end of the conical member 14. The member 14 in the present embodiment is of a one-piece metal construction and the central bore 14a is of a sufficiently large diameter for comfortably accommodating the cable 12. Alternatively, and as will be more fully explained hereinafter, the member 14 may be composed of a pair of mating half-sections applied about the cable. The flange 16 formed at the enlarged end of the member 14 is in the illustrated device of an annular configuration with notches 16a formed therein at regularly spaced intervals about the periphery of the flange.

The flange structure 16 of member 14 is provided for captivating helically preformed rod means 18. The individual helical elements 18 are each preformed to a predetermined pitch length and a nominal internal diameter less than that of the cable 12. In order to secure each of the helical elements 18 to the flange 16, each element 18 is provided with an upstanding head portion 18a of a greater diameter than the notches 16a in the flange 16. In forming the subassembly of the conical member 14 and helical rods 18, the individual rod elements 18 are slidably inserted into respective ones of the notches 16a with the upstanding head 18a in close proximity to the top surface of the flange 16. The slide-in feature facilitates fabrication of the subassembly; however, it will be recognized by those skilled in the art that other means may be employed for captivating the helical elements to the flange 16.

The appliance 10 further includes an exterior or outer housing 20 for seating the subassembly 14, 18. The housing 20 is of a cylindrical exterior contour with a tapered central passageway 20a of a contour complementary to that of the frustro-conical member 14. Upon sliding the subassembly 14, 18 into the central passageway 20a of the housing 20, the helical elements 18 are wedged intermediate the members 14 and 20 which, in conjunction with the captivated head portions of the rods is effective to preclude lineal movement of the rods 18 relative to the cable 12. The lower portions of elements 18, of course, are wrapped about and grip the cable 12 in conventional fashion.

It will be understood that the helical elements 18 may be similar to those utilized in the construction of other appliances such as those disclosed in U.S. Letters Pat. to Thomas F. Peterson, e.g., Nos. 2,609,653 and 2,761,273 and may be manufactured by any suitable method such as that disclosed in U. S. Pat. No. 2,691,865, all of which patents are assigned to the same assignee as the present invention. Generally, the helical elements 18 will be made of aluminum, steel or similar metals, although molded plastics or the like may be used in certain circumstances. In the event that the elements are composed of interwound strands, the individual strands may be secured, if desired, in their bridging relationship by means of an adhesive, solder, brazing compound or the like.

In order to facilitate connection to a support (not shown), the housing 20 includes at its upper end a heavy annular flange 20b which overlies an annular collar 22 that is slidably mounted about the narrowed cylindrical body of the housing 20. The collar 22 includes a pair of diametrically opposed bores 22a and 22b that are adapted to receive respective ends of a U-shaped bail 24. The ends of the bail 24 underlying the collar 22 are provided with enlarged head portions for securing the bail to the collar. The collar 22 and thus the bail 24 are freely rotatable about the axis of the cable 12. Since the collar is easily removed from the housing, it is possible to provide collars and bails of various sizes permitting an installer to select a bail and collar of acceptable size to suit the particular installation. Also the collar may be threadably connected to the body to provide a measure of adjustability. It will be recognized by those skilled in the art that other means of attaching the housing 20 to a support may be utilized consistent with the present invention including an integral clevis or the like.

The appliance 10 is assembled to the cable by slidably and consecutively inserting the housing 20 and the frustro-conical member 14 over the end of the cable 12 with the selected collar and bail already in place on the housing. The member 14 is disposed at a desired location along the cable 12 and the helical elements 18 are interwrapped about the cable 12 in tightly gripping relation therewith, as seen most clearly in FIG. 2. The housing 20 is next slid upwardly over the member 14 and the surrounding helical elements 18 to securely locate the member 14 within the tapered passageway of the housing 20 and with the helical elements 18 firmly wedged therebetween, as seen in FIG. 1. The bail 24 is then secured to an appropriate support.

A modified form of the subassembly carried contact. the housing 20 is illustrated in FIGS. 4 and 5. Specifically, as there shown, the subassembly comprises a frustro-conical member 26 that is split along its longitudinal axis to form a pair of opposed and mating half-sections that are disposed about the cable 12'. The mating half-sections of the member 26 cooperatively define a central bore 26a that is of a slightly smaller diameter than that of the cable 12' when the half-sections are in contact. Thus, pressure applied to the opposed half-sections of member 26 is translated directly to the cable 12'.

The member 26, like its counterpart member 14 in FIGS. 1–3, includes an annular flange structure 28 at its enlarged end. The flange 28 in the present embodiment includes comparatively large cut-outs at regularly spaced intervals about the circumference of the flange so as to define a series of regularly spaced keys. The longitudinal split of the member 26 lies along a diameter that bisects a pair of oppositely disposed keys of the flange structure 28. As will be seen, this arrangement facilitates a holding together of the half-sections of the member 26 during initial assembly procedures.

The modified subassembly of FIGS. 4 and 5 further includes a plurality of helical elements 30 which differ rather significantly from their counterparts 18 of FIGS. 1–3. Specifically, the helical elements 30 each includes a pair of helically preformed leg portions for wrapping about the cable 12' in tightly encircling and gripping relation therewith and a return bent right bight portion that is captivated by the flange structure 28. As seen in the drawings, the bight of the helical elements 30 is bent in a hair pin-like fashion so as to tightly encircle its associated key and with the opposed leg portions of the bight extending parallel to one another and to the cable 12' and in closely adjacent relation to one another over the major portion of the length of the frustro-conical member 26. The opposed helical legs of each element 30 are of a like hand of lay and are spaced in closely adjacent relation to one another and in tightly encircling and gripping relation with the cable 12'. The described subassembly of FIGS. 4 and 5 is installed in the housing 20 in like fashion to its counterpart depicted in FIGS. 1–3.

While particular embodiments of the present invention have been shown and described, it is apparent that various changes and modifications may be made, and it is therefore intended in the following claims to cover all such modifications and changes as may fall within the true spirit and scope of this invention.

We claim:

1. A termination appliance for a cable or the like, comprising:
    cable receiving means comprising an elongated member of a generally frusto-conical contour having a central bore for passing said cable and having a peripheral flange structure;
    helically preformed rod means comprising a plurality of helical elements each preformed to a predetermined pitch length and a nominal internal diameter less than that of said cable and each captivated by said flange structure and extending from said flange structure along and beyond said frusto-conical member for gripping said cable; and
    housing means having a central passageway of a contour complementary to that of said frusto-conical member for receiving the subassembly of said cable receiving means and said helically preformed rod means.

2. The termination appliance of claim 1 in which said frusto-conical member is comprised of a pair of mating half-sections cooperatively defining a bore of a diameter such that pressure applied to said half-sections is translated to said cable.

3. The termination appliance of claim 2 in which said helical elements each include a pair of helically preformed leg portions for wrapping about said cable and a return bent bight portion captivated by said flange structure.

4. The termination appliance of claim 3 in which said flange structure comprises a plurality of regularly spaced openings defining a plurality of radially extending keys and in which said bight portions of said helical elements are looped over respective ones of said keys to captivate said helical elements.

5. The termination appliance of claim 4 in which said housing means includes a U-shaped bale having its opposite ends secured to said housing means and its intermediate portion adapted for securance to a support.

6. The termination appliance of claim 5 in which said helical elements are wedged intermediate said frusto-conical member and said housing means.

7. The termination appliance of claim 6 in which said flange structure is formed at the enlarged end of said frusto-conical member.

8. The termination appliance of claim 1 in which said helical elements each comprise a single elongated helical leg for wrapping about said cable and an upstanding head portion at one end of said leg for engaging said flange structure.

9. The termination appliance of claim 8 in which said frusto-conical member is of a one piece construction.

10. The termination appliance of claim 9 in which said peripheral flange comprises a plurality of regularly spaced openings of a dimension for passing said helical legs but with said upstanding head portions being captivated by the flange structure contiguous said openings.

11. The termination appliance intermediate claim 10 in which said helical elements are wedged intermedaite said frusto-conical member and said housing means.

12. The termination appliance of claim 11 in which said flange structure is formed at the enlarged end of said frusto-conical member and in which said openings comprises peripheral notches in said flange structure.

* * * * *

UNITED STATES PATENT OFFICE
CERTIFICATE OF CORRECTION

Patent No. 3,775,811　　　　　　　Dated December 4, 1973

Inventor(s) Clarence E. Smrekar and Erwin H. Goetter

It is certified that error appears in the above-identified patent and that said Letters Patent are hereby corrected as shown below:

In the Abstract, Line 5, delete the second "the" and insert therefor --and--.

Column 1, line 58, "Referrin" should be --Referring--.

Column 3, line 23, "contact" should be --by--.

Column 3, line 53, delete the word "right".

Column 4, line 61, "intermediate" should be --of--.

Column 4, line 62, "intermedaite" should be --intermediate--.

Signed and sealed this 20th day of August 1974.

(SEAL)
Attest:

McCOY M. GIBSON, JR.　　　　　C. MARSHALL DANN
Attesting Officer　　　　　　　Commissioner of Patents